United States Patent [19]
Rutner

[11] 3,820,252
[45] June 28, 1974

[54] HUMAN REACTION MEASURING MEANS

[76] Inventor: Ivan Toby Rutner, 333 Baltimore Rd., Winnipeg, R3L-1J2 Manitoba, Canada

[22] Filed: Feb. 6, 1973

[21] Appl. No.: 330,084

[52] U.S. Cl. ................................. 35/22 R, 119/54
[51] Int. Cl. ...................... G09b 19/00, A01k 5/00
[58] Field of Search............ 35/22 R; 119/29, 51 R, 119/54; 273/1 R, 1 E

[56] References Cited
UNITED STATES PATENTS

| | | | |
|---|---|---|---|
| 2,341,678 | 2/1944 | Wickes................................ | 35/22 R |
| 3,204,608 | 9/1965 | Snitz..................................... | 119/54 |
| 3,596,376 | 8/1971 | Avedissian.......................... | 35/22 R |

*Primary Examiner*—Wm. H. Grieb
*Attorney, Agent, or Firm*—Stevens, Davis, Miller & Mosher

[57] ABSTRACT

This invention relates to means for the measurement of human reactions, the reactions concerned being the reactions of interest or of aversion experienced by a human when he is caused to view some object, animal or scene having special connotations. Human reaction measuring means are described which include viewing means by which a selected scene can be viewed, and first initiating means by which viewing of the viewing means can be rendered effective by a potential viewer to permit viewing of the selected scene. Signal means are provided by which the potential viewer can be instructed to operate the first initiating means, and timer means are provided by which at least the time interval between operation of the first initiating means and operation of the second terminating means can be ascertained.

6 Claims, 4 Drawing Figures

PATENTED JUN 28 1974　　3,820,252

HUMAN REACTION MEASURING MEANS

This invention relates to means for the measurement of human reactions, the reactions concerned being the reactions of interest or of aversion experienced by a human when he is caused to view some object, animal or scene having special connotations.

Merely by way of example, an aversion to rats is very common, and one possible use of the apparatus of the present invention would be to measure the reaction by a specific human to a rat. On the other hand, the invention can be used to measure "interests."

In the practice of psychology, it is often important to obtain some quantitative measure of the "fear" response or the "interest" response of a patient or subject to a given visual situation. Thus, in the case of a rat, most people suffer a feeling of aversion, but most people can rationalise this fear, and when faced with a rat under circumstances in which they must know there is no physical danger, they can observe the rat without undue stress. On the other hand, some people experience an undue feeling of stress in these circumstances, sufficient to cause a feeling of physical sickness or weakness. The object of the present invention is the provision of apparatus by which a subject can be tested to ascertain the magnitude of his fear response to the given object, animal or scene.

According to one aspect of the present invention, human reaction measuring means includes viewing means by which a selected scene can be viewed, first initiating means by which viewing of the viewing means can be rendered effective by a potential viewer to permit viewing of the selected scene, second terminating means by which the viewing means can be rendered ineffective by the viewer so as to cause termination of viewing of the selected scene, signal means by which the potential viewer can be instructed to operate the first initiating means, and timer means by which at least the time interval between operation of the first initiating means and operation of the second terminating means can be ascertained.

The invention will now be described, by way of example, with reference to the accompanying drawings, in which.

Figure 1:
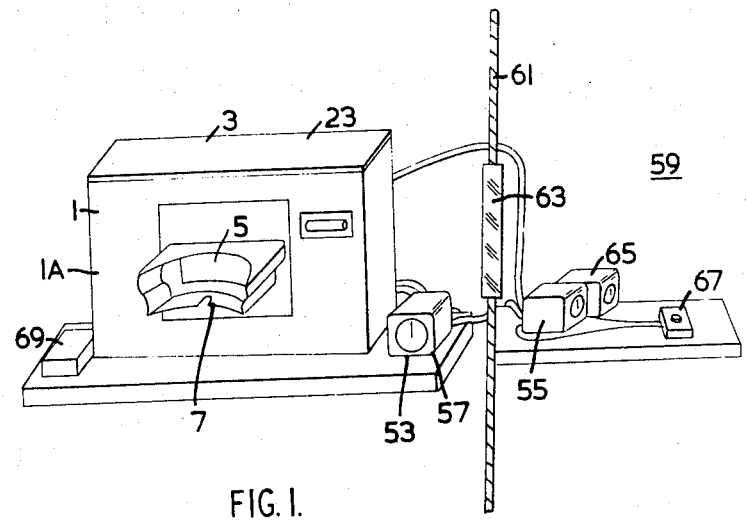
FIG. 1 is a perspective drawing, viewed from the front, of apparatus for the measurement of human reactions.
Figure 2:
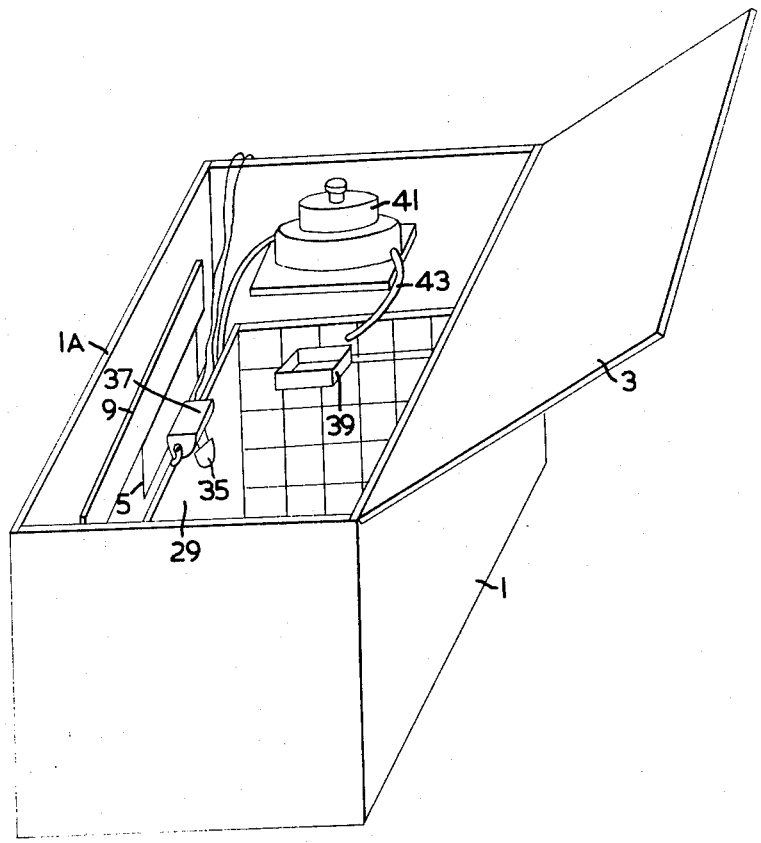
FIG. 2 is a perspective drawing of the apparatus shown in FIG. 1, but as viewed from the side with a lid in the open position, and an inner lid omitted.

Referring first to FIG. 1, a box 1 having a height and a depth of 2 feet and a length of 3 feet is provided with a hinged lid 3 and, in its front wall 1A, with a viewing aperture 5 having a height of 3 inches and a length of 6 inches, and positioned at about the mid-height and at about the midlength of the front wall 1A of the box. Secured to the outside of the front wall is a viewing mask 7 against which a viewer can place his head while viewing the inside of the box. Inside the box is fitted an electric light, not detailed, so the contents of the box can be seen by the viewer.

Figure 3:
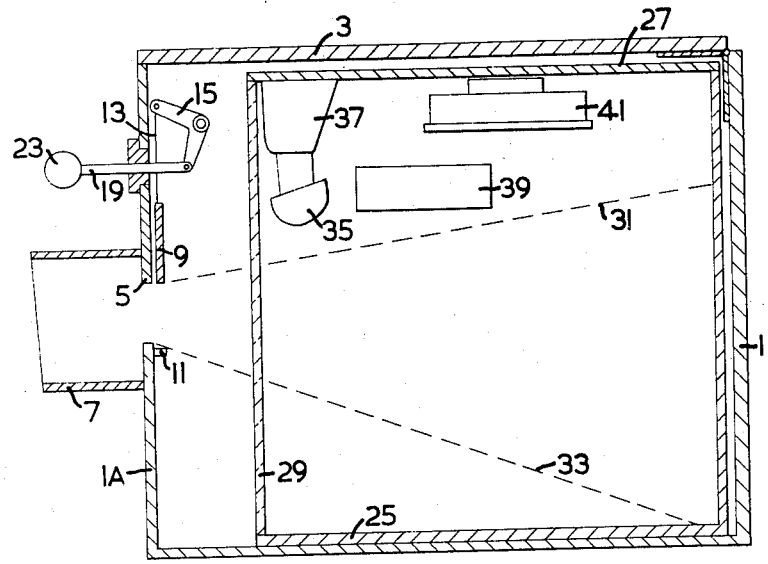
FIG. 3 is a sectional side elevation taken on the line III—III of FIG. 1.

Mounted on the inside of the front wall is a rectangular shutter 9 movable between an upper position shown in FIG. 3 in which it fails to obscure the aperture 5 to a lower position in which it rests on a stop 11 and covers aperture 5. The shutter 9 is supported from two wires 13 which are attached to the shutter near its ends and at their upper ends are connected to arms of bellcrank levers 15 carried by brackets (not detailed) mounted on the front wall 1A. The other arms of those levers 15 are pivotally connected to an inner end of a push rod 19 slidably mounted in a bushing 21 carried by the front wall and carrying at its outer end a cylindrical handle 23.

Removably positioned inside the box 1 is an inner box 25 of a type known in the art of psychology as a modififed operation conditioning chamber, or "Skinner Box." Box 25 is designed and constructed to contain a specimen, such as a rat, and includes a hinged lid 27 and a transparent front wall 29. As will be clear from FIG. 3, a subject looking through the aperture 5 can see through this front wall 29 and can see the part of the inside of the inner box defined by the dotted lines 31 and 33. Mounted on the front wall 29, in such a position that it is above the aperture 5 but cannot be seen by the viewer, is a response lever 35 carried by a unit 37 which includes electrical contacts (not detailed). The arrangement is such that a rat in the inner box 25 can reach up to and actuate the lever 35 to effect opening of the said contacts. Mounted on a side wall of the box 25, again at such a level that they cannot be seen by the viewer, is a food cup 39 and an automatic feeder 41. A pipe 43 causes food pellets released by the automatic feeder 41 to be deposited in the food cup 39.

The arrangement of response lever, automatic feed and food cup is well known in what is known as a "Skinner Box." The automatic feeder can be set to different settings, and in the one used in the apparatus shown, when the response lever 35 has been actuated 20 times, a single food pellet is supplied by the automatic feeder to the food cup. This is known in the art as a FR20 schedule of reinforcement.

Figure 4:
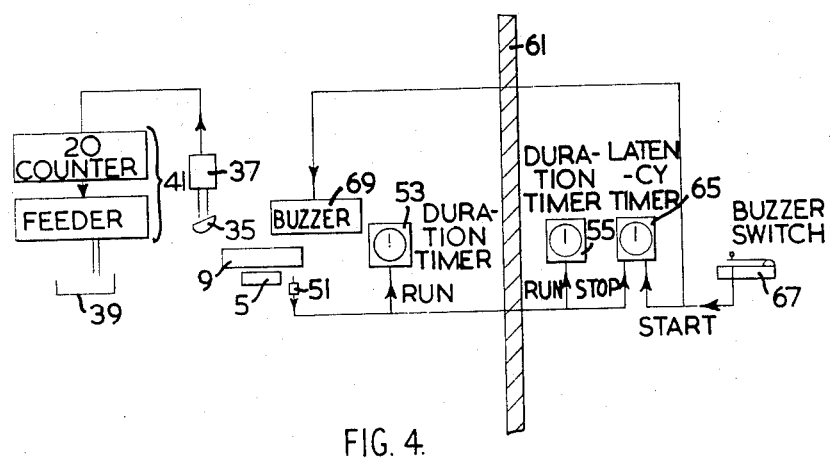
FIG. 4 is a diagrammatic representation of electrical circuits used in the apparatus of FIGS. 1, 2 and 3.

Referring now to FIGS. 1 and 4, taken in conjunction, a microswitch 51 is associated with the lower edge of the shutter 9 so that it is closed whenever the shutter is raised out of contact with the stop 11. This microswitch controls the energisation of two duration timers 53 and 55, so that they start when the shutter is raised and stop when the shutter returns to its downward position. The timer 53 is placed on a bench 57 which supports the box 1, but timer 55 is placed in an adjacent room 59, the wall 61 between the two rooms being provided with a "one-way" window 63 such that a doctor in room 59 can observe the subject, but the subject is not aware of being observed. The microswitch 51 is also connected to "stop" terminals on a third "latency" timer 65 also located in room 59. A manually operated switch 67 in room 59 can be operated by the doctor to energise a buzzer 69 positioned on the bench 57. This switch 67 also operates the "start" input of latency timer 65, so that this timer starts when the buzzer sounds and stops when the subject lifts the shutter 9.

In order to explain the operation and use of the apparatus described above, it will be assumed that a subject is to be examined to ascertain his phobic behavior as far as live rats is concerned.

A suitable rat is placed in the inner box 25, and it is desirable that this rat be preconditioned before the test on the subject starts. Thus, a 1 year old hooded rat, which had been subject to withdrawal of food until his weight had dropped to 80 percent of his "free-feeding" weight, is placed on a FR20 schedule of reinforcement until a stable rate of responding to the conditions in the Skinner Box is maintained. Thus, the rat will run across the box to the front wall, stand on its hind legs to reach the response lever 35, and operate that lever 35 20 times. He will then run to the food cup 39 to take the food pellet which had been fed from automatic feeder 41 through pipe 43, and after eating the pellet he will run back to the front wall to repeat the sequence.

The subject to be tested is seated in front of the box 1, and told that there is a live rat in the box directly in front of him. He is told that, at the sound of the buzzer 69, he is to look into the box through aperture 5, pulling the handle 23 to open the shutter, and to focus his attention on the rat. He is told to view the rat for as long as he can, and when he feels that he can no longer look at it, he is to release the handle and terminate the trial.

When the subject pulls the handle 23, the shutter 9 is lifted and the subject is able to observe the rat, which tends to ignore the subject and to carry on with his task of operating the response lever 35 to obtain food pellets. Because of the position of the response lever 35, above the field of view of the subject and in the front wall of the inner box, the rat appears to be attacking the front wall of the inner box, standing on its hind legs. The rat, after a short period, runs across the box, rears up against the side wall, takes a food pellet from the invisible food cup, eats it in view of the subject, and then returns to scrabble at the front wall in reaching for the response lever.

It was found that, if a subject was given five trials on the apparatus described above, in the case of a subject with a low-phobic reaction he could, by the time of the fifth trial, watch the rat for 30 seconds or more. Other subjects, with a high-phobic reaction to rats, could not tolerate 30 seconds even after the five trials.

The apparatus described above provides a standard test which can be applied to each of a group of subjects, in order that their phobic reactions to the given stimulus can be ascertained. The test is much more precise than the test previously used, which consisted of telling the subject to approach as close as he could to a rat in a cage. In that previous test, so many ambient conditions were variables, that any given test was inconclusive unless the subject had a very high or a very low phobic reaction.

It will be clear to those skilled in this branch of medicine that other animals, insects, birds and even inanimate objects can be viewed in this apparatus, and that modifications of the Skinner Box can be used to increase the reaction-producing effect on the subject.

Further, models or pictures can be used in the box, and if desired the arrangement of shutter can be incorporated in the wall of a cage or a room to permit the viewing of larger specimens.

In the case of the rat, and in the case of certain specimens such as spiders and snakes, one is measuring the aversion of the human subject to the specimen. In the case of other specimens, one may be measuring the interest of the subject in the specimen. Thus, in the investigation of the sexual phobias of the subject, one may be investigating undue interest by the subject in some specimen which is representative of some aspect of sexual behaviour.

Thus, the apparatus may be used to measure the depth of phobias, in the wide sense of undue reactions of either interest or aversion to a given specimen or set of visually perceived circumstances.

It will be appreciated that the use of the Skinner Box is by way of example only, and in many instance it will be sufficient to show inanimate objects or unsuitable subjects, with which a Skinner Box would serve no useful purpose.

The embodiments of the invention in which an exclusive property or privilege is claimed are defined as follows:

1. Human reaction measuring means including:
   a. viewing means by which a selected scene can be viewed;
   b. first initiating means by which viewing of the viewing means can be rendered effective by a potential viewer to permit viewing of the selected scene;
   c. second terminating means by which the viewing means can be rendered ineffective by the viewer so as to cause termination of viewing of the selected scene;
   d. signal means by which the potential viewer can be instructed to operate the first initiating means; and
   e. timer means by which at least the time interval between operation of the first initiating means and operation of the second terminating means can be ascertained.

2. Human reaction measuring means as claimed in claim 1, and in which further timer means are arranged to provide a measure of the time elapsed between operation of the signal means and operation of the first initiating means.

3. Human reaction measuring means as claimed in claim 1, wherein the viewing means comprise a window in a wall of a first container, and an inner container placed in the first container is adapted to contain a live specimen, the inner container having a transparent wall opposite said window.

4. Human reaction measuring means as claimed in claim 1, wherein the viewing means is associated with a container adapted to house a live specimen, this container including conditioning means by which the specimen is caused to be in continual animation, whereby the viewer will at all times be confronted with an active specimen on operating the first initiating means.

5. Human reaction measuring means as claimed in claim 1, wherein the viewing means is associated with a container adapted to house a live specimen, this container including response means operable by the specimen, and feeding means operable by the response means, whereby the specimen is encouraged repeatedly to operate the response means to obtain food from the feeding means.

6. Human reaction measuring means as claimed in claim 1, wherein the viewing means is associated with a container adapted to house a live specimen, this container including response means operable by the specimen, but not visible to the viewer, and reward means operable by the response means, the response means being so located that the specimen would appear to attack the viewer in reaching for the response means.

* * * * *